G. E. HALLENBECK.
DRILLING MACHINE.
APPLICATION FILED SEPT. 12, 1914.
1,256,790.
Patented Feb. 19, 1918.
3 SHEETS—SHEET 1.
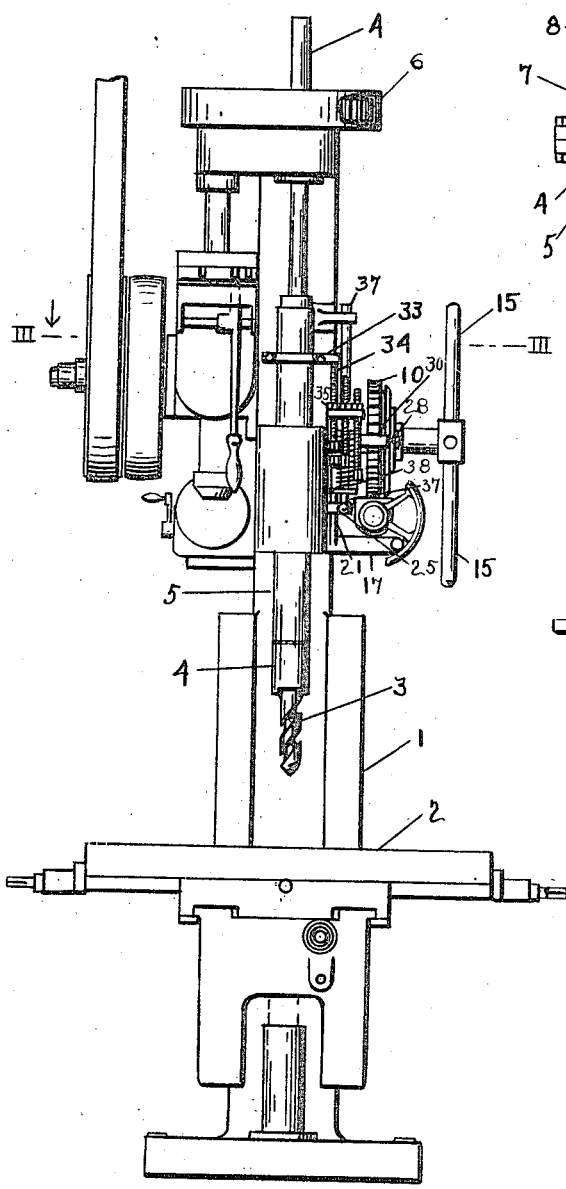
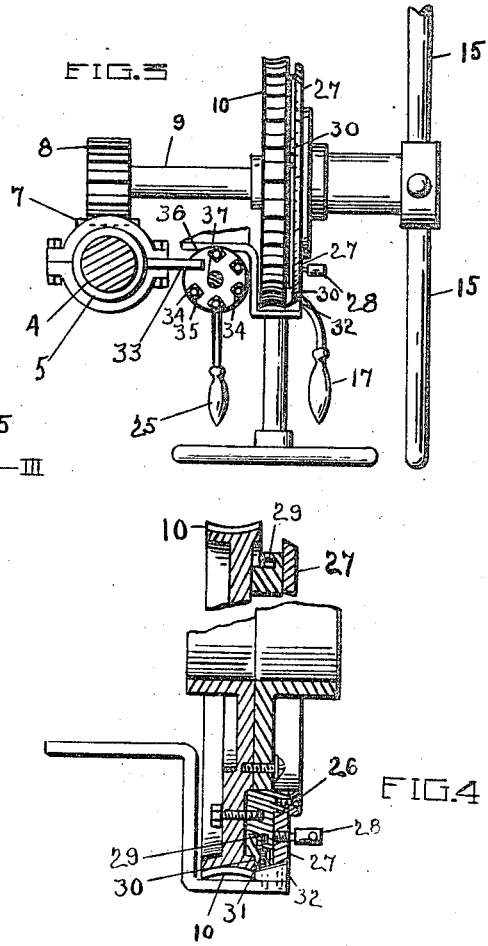
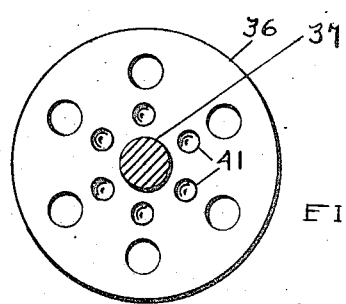

G. E. HALLENBECK.
DRILLING MACHINE.
APPLICATION FILED SEPT. 12, 1914.
1,256,790.
Patented Feb. 19, 1918.
3 SHEETS—SHEET 2.
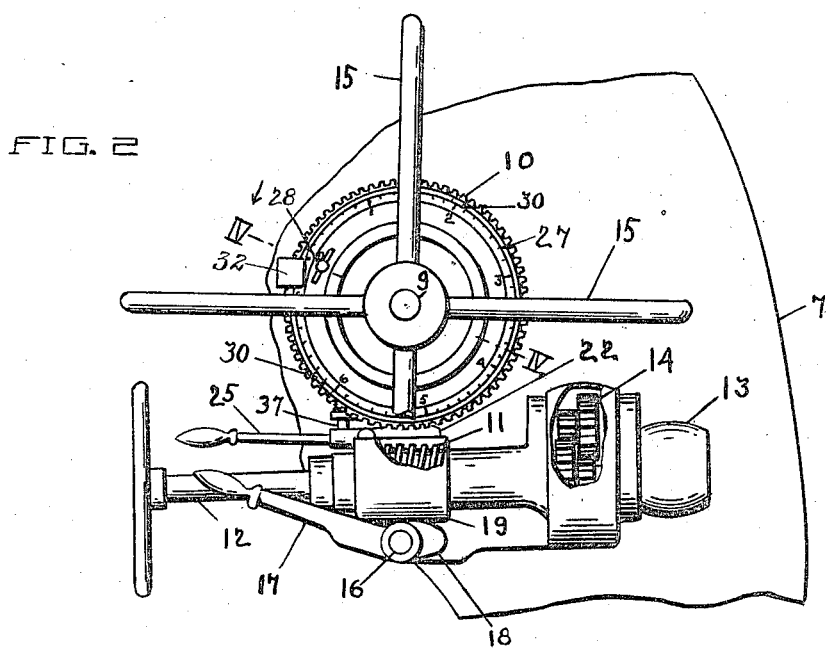
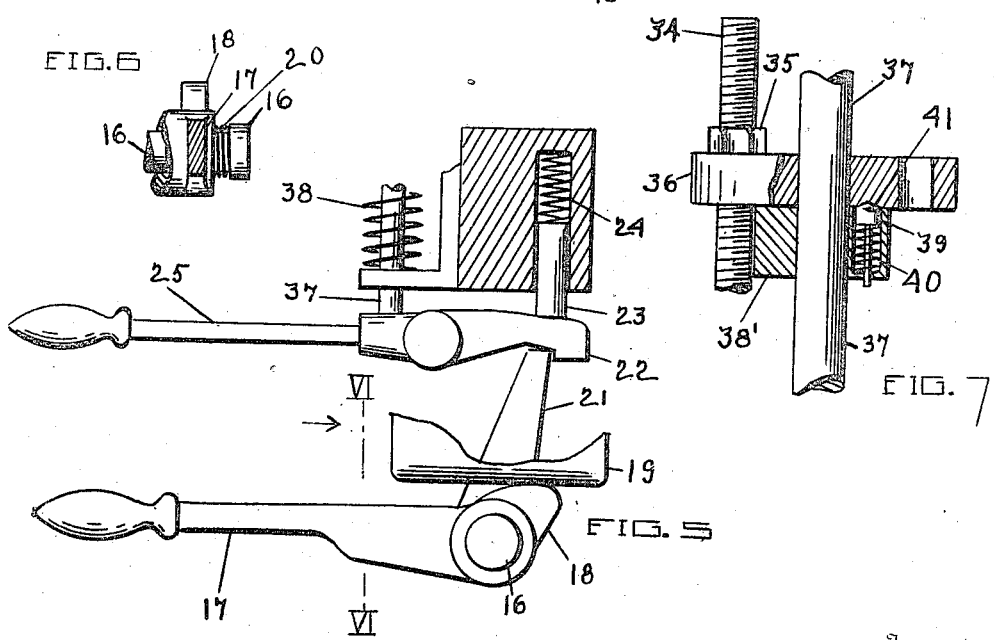
Witnesses
Gladys Jameson.
C. H. Rauch
Inventor
George E. Hallenbeck
By Geo. Kirk
Attorney

G. E. HALLENBECK.
DRILLING MACHINE.
APPLICATION FILED SEPT. 12, 1914.

1,256,790.

Patented Feb. 19, 1918.
3 SHEETS—SHEET 3.

George E Hallenbeck
Inventor

Attorney

UNITED STATES PATENT OFFICE.

GEORGE E. HALLENBECK, OF TOLEDO, OHIO, ASSIGNOR TO BAKER BROTHERS, OF TOLEDO, OHIO, A FIRM.

DRILLING-MACHINE.

1,256,790. Specification of Letters Patent. Patented Feb. 19, 1918.

Application filed September 12, 1914. Serial No. 861,353.

*To all whom it may concern:*

Be it known that I, GEORGE E. HALLENBECK, a citizen of the United States, residing at Toledo, Lucas county, Ohio, have invented new and useful Drilling-Machines, of which the following is a specification.

This invention relates to travel or feed determining and control means.

This invention has utility when embodied in machine tools, as drills, for quickly setting the travel thereof, even for a plurality of depths of cut.

Referring to the drawings:

Figure 1 is a front elevation of a machine tool embodying the invention herein;

Fig. 2 is a fragmentary view from the right of Fig. 1, showing features of the drive, setting means and trip;

Fig. 3 is a fragmentary section on the line III—III, Fig. 1, looking in the direction of the arrow;

Fig. 4 is a section on an enlarged scale, on the line IV—IV Fig. 2, looking in the direction of the arrow;

Fig. 5 is a view of portions of the trip of Fig. 2, on an enlarged scale, and with parts broken away;

Fig. 6 is a view on the line VI—VI, Fig. 5, looking in the direction of the arrow;

Fig. 7 is a fragmentary view of the mounting for the annular series of abutments;

Fig. 8 is a bottom plan view of the abutment holder of Fig. 7;

Figure 9:
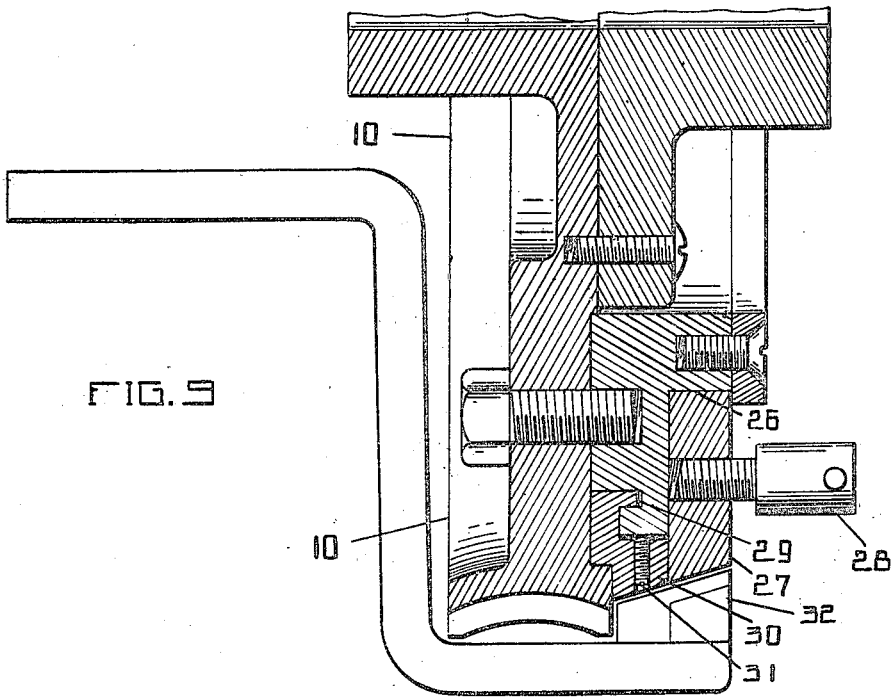
Fig. 9 is a fragmentary section through the worm wheel and associated actuation features.
Figure 10:
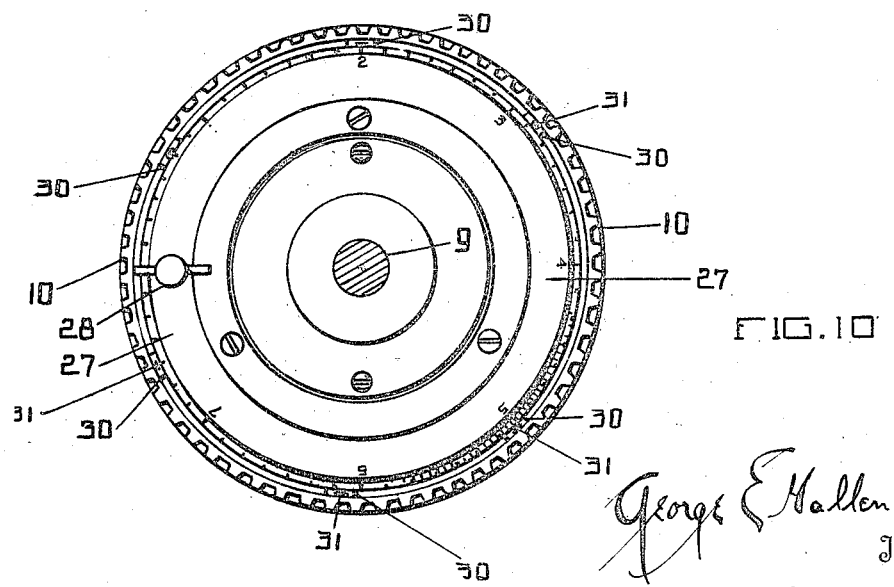
Fig. 10 is a front view of the devices of Fig. 9.

The drill press embodies the frame 1 supporting the work holding platform 2 in position to oppose the rotary tool 3 carried by the holder 4, the feed of which toward the table 2 is regulated by the travel of the sleeve 5. The holder 4 is rotated by driving gearing 6. The sleeve 5 carries the rack 7 (Fig. 3) with which the pinion 8 on the shaft 9 coacts to move the tool 3 toward and from the work on the table 2.

The shaft 9 is actuated by the driving member or worm wheel 10 thereon which is normally in mesh with the worm 11 on the shaft 12 pivotally mounted by the bearing 13 (Fig. 2) to swing into and out of mesh with the wheel 10.

The shaft 12 is rotated by the gearing 14.

The arms 15 on the shaft 9 may be operated for manually setting the tool 3, or for positioning the sleeve 5 in connection with operating the machine to predetermined positions, as against a test piece of material to determine the starting point or first zero position from which the working is to be measured.

Extending parallel to the shaft 9, at right angles to and just below the shaft 12 is the shaft 16 upon which is mounted the handle 17 having the cam 18, whereby moving of the handle 17 downward will rock the cam 18 against the housing 19 for the worm 11, and thereby lock the worm and worm wheel in driving relation. The parts are held in this driving relation against the resistance of the torsion spring 20 by the arm 21 fast with the handle 17 and cam 18 being engaged by the dog 22 held thereagainst by the plunger 23 abutted by the compression spring 24. Manually forcing the handle 25 downward against the action of the spring 24 will permit the spring 20 to act to throw the driving member 10 out of driving operation by the worm 11 lowering away therefrom.

The driving member 10 is provided on one of its faces with an annular groove 26 in which is relatively rotatably mounted the graduated member 27, which by means of the handled screw 28 may be locked in various adjusted positions as to the member 10. The member 10 is also provided with a second annular groove 29 in which the pointers or blocks 30 may be shifted to various positions as to the member 10 and then locked by the screws 31. The graduations on the member 27 may be in units of length say to correspond with the travel distances of the tool 3, and as each of these elements 27, 30, of the feed determining means is adjustable as to the member 10, they may be conveniently set for any position of the table 2, any length of tool 3 or thickness of work upon the table 2, and with such setting of one of these elements definite handling of work may be had fully determined by the setting of the machine before the work is brought to the machine.

These features of setting, in connection with the fixed pointer 32, may serve as an indicator for manual control of the machine.

The graduated member 27 may be initially angularly set as to the fixed pointer 32, for the graduation indicated of a predetermined travel of the tool, or the graduated member may be used to set an adjustable pointer 30 angularly shifted in the annular groove 29 the desired distance from the fixed pointer 32. The graduated member 27 and any adjustable pointer 30 may be set independently of the fixed pointer 32. It is possible to have several points of indication, of tool travels. The first tool travel distance may be determined by the adjustable pointer 30 and the fixed pointer 32. From this positioning of said adjustable pointer 30, for the first tool travel distance, the graduated member 27 may be again shifted and locked at some point with its zero spaced from the locked adjustable pointer 30, to set a second adjustable pointer 30, and so on. These features may facilitate rapid manual control. For automatic control, further features may be incorporated.

Adjustably clamped on the sleeve 5 is the abutment 33 set in line to coact in its travel with an opposing abutment 34, also adjustable by the nut 35 as to the carrier plate 36 mounted on the stem 37, normally projected upward by the spring 38. This stem or plunger 37 is in position to actuate the handle 25 when forced down by the abutment 33 traveling with the tool 3. When the handle 25 is so actuated there is brought about the automatic tripping of the feed means to disconnect the driving operation of the member 10 by the worm wheel dropping out of driving relation therewith.

The plate 36 is held in position as to the stem 37 by the collar 38' fast to the stem 37 and carrying the plunger 39 actuated by the spring 40 to seat in one of the recesses 41 in the lower side of the plate 36. The annular series of abutments 34 carried by the plate 36 may be adjusted.

By operating the machine in accordance with a setting of an adjustable pointer 30 at graduation "2" on the member 27 with zero at the fixed pointer 32 and stopping the drill 3 when the member 10 in feeding the drill 3 brings the pointer 30 to the pointer 32, a definite position is found in this test run for the sleeve member 5 and abutment 33 carried thereby. Conversely, instead of scaling from the indications, a test piece may have the drill fed down thereto, pointer 30 set to such found position, and there locked to the member 10; then the hole cut in the work has the drill inserted, and at this position of the member 10 as to the fixed pointer 32 a second pointer 30 may be locked to the member 10. By adjusting an opposing abutment 34 to be engaged by the abutment 33 at this stopped position of the machine, a repetition of this driving operation of the machine in a test run or work handling runs will result in the abutments 33, 34, automatically acting to stop the machine at the determined travel position for the tool 3, for these abutments 33, 34, act to force the member 37 down against the resistance of the spring 38 (Fig. 5), and rock the member 25 against the resistance of the spring 24, to release the dog 21, thereby allowing the member 19 with the worm 11 to fall away from driving relation with the member 10 or worm wheel. Feeding of the drill 3 is thus stopped. In the settings of the other abutments 34, the initial running of the feed to determine the position of the sleeve 5 may be on a standard piece of work, or to points on the scale say with zero of the member 27 at the last set adjustable pointer 30, or from the fixed pointer 32, as may be elected in the manipulation of the graduated member 27. With these settings of the abutments, the plate 36 may be easily shifted to have the plunger 39 hold any particular abutment 34 in position to act automatically in stopping the machine at any desired depth of cut, or different depths of cut may be successively run in the same or different pieces, as desired, the adjusted abutments permitting ready automatic feeding as required. Quick and definite operations over a great range easily made possible are readily procured. The action of the abutments brings about a trip for quick definite release of the feed drive from actuating the drill.

In operating the drill, a piece of the work which is about to be drilled may be placed as a test piece under the drill and the drill fed down until its point touches the upper surface of the test piece.

The graduated member 27 may then be turned until the point marked zero coincides with the upper edge of the fixed pointer 32, and the adjustable pointer 30 is moved to the point on the graduated member 27 which indicates the depth to which it is desired the hole should be drilled, say two inches. The test piece may now be removed, the machine started, and the drill allowed to descend until the pointer 30 is seen to coincide with the fixed pointer 32, thus indicating that the drill has descended to the desired depth of two inches. One of the abutments 34 is now so adjusted that its upper end will contact the abutment 33 so as to release the dog 22 from the arm 21.

The machine is now in condition to stop automatically when the drill has penetrated the work to the depth for which it has been set, the abutment 33 by its contact with abutment 34 forcing down the stem 37 which actuates the handle 25 and forces the dog 22 upward against the force of the spring 24, operating as a trip, thus releasing the arm 21 and permitting the spring 20 to throw the worm 11 out of driving relation with the driving member 10,

What is claimed and it is desired to secure by Letters Patent is:

1. A machine tool, a driving member for feeding the tool, and feed determining means for the tool including a graduated member, a pointer therefor, each having adjustable means for locking to the driving member in different positions as to the driving member and each other for disclosing tool travel distance, a trip device for disconnecting the driving member from actuating the tool, and an independently adjustable means for timing the throw off of the trip device.

2. A machine tool, a driving member for feeding the tool, and feed determining means for the tool including a shiftable graduated member, a shiftable pointer therefor, means for locking the pointer and graduated member in different positions as to the driving member for disclosing tool travel distance, a trip device for disconnecting the driving member from actuating the tool, and an independently adjustable means for timing the throw off of the trip device.

3. A machine tool, a driving member for feeding the tool, and feed determining means for the tool including a graduated member, a plurality of pointers adjustably carried thereby, and means for locking the graduated member in different positions as to the pointers.

4. A machine tool, a driving member for feeding the tool, and feed determining means for the tool including a graduated member, a first pointer mounted thereon, and a second pointer adjustably mounted on the graduated member and as to which the first pointer is adjustable.

5. A machine tool, a driving member for feeding the tool, and feed determining means for the tool including a rotatable holder, a graduated member carried thereby, a first pointer carried by the holder, and a second pointer also carried by the holder and as to which the graduated member is adjustable.

6. A machine tool, a driving member for feeding the tool, and feed determining means for the tool including a graduated member, a first pointer therefor, a second fixed pointer, said pointers being relatively adjustable for determining the travel distance for the tool, and an adjustable trip for throwing out the driving member, said pointers and graduated member coacting to permit definite positioning of the trip.

7. A machine tool rotary holder, a reciprocable sleeve for feeding said holder, a rotary driving member for actuating the sleeve, graduated means coacting with the driving member for predetermining the distance of travel of the sleeve, and an abutment mounted on the sleeve and adjusted as determined by the means to automatically throw out the driving member.

8. A machine tool, a driving member for feeding the tool, and feed determining means for the tool including a movable member providing a plurality of set point abutments for operation, means for holding the movable member in definite adjusted positions, and a relatively movable trip to be acted upon from the abutment member to throw the driving member out of tool driving operation.

In testimony whereof I affix my signature in the presence of two witnesses.

GEO. E. HALLENBECK.

Witnesses:
 GEO. E. KIRK,
 GLADYS JAMESON.

Copies of this patent may be obtained for five cents each, by addressing the "Commissioner of Patents, Washington, D. C."